(12) United States Patent
Ota et al.

(10) Patent No.: US 10,260,624 B2
(45) Date of Patent: Apr. 16, 2019

(54) CONTROL DEVICE FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Keisuke Ota, Toyota (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 15/641,548

(22) Filed: Jul. 5, 2017

(65) Prior Publication Data

US 2018/0023691 A1    Jan. 25, 2018

(30) Foreign Application Priority Data

Jul. 19, 2016 (JP) .................................. 2016-141133

(51) Int. Cl.
| | | |
|---|---|---|
| *F16H 61/02* | (2006.01) | |
| *F16H 61/04* | (2006.01) | |
| *F16H 59/14* | (2006.01) | |
| *F16H 59/68* | (2006.01) | |

(52) U.S. Cl.
CPC ..... *F16H 61/0204* (2013.01); *F16H 61/0403* (2013.01); *F16H 59/14* (2013.01); *F16H 59/68* (2013.01); *F16H 2059/147* (2013.01); *F16H 2059/6807* (2013.01)

(58) Field of Classification Search
CPC ........... F16H 61/0204; F16H 2056/147; F16H 2059/6807; F16H 59/14; F16H 59/68
See application file for complete search history.

(56) References Cited

U.S. PATENT DOCUMENTS

| | | | |
|---|---|---|---|
| 2012/0083980 A1* | 4/2012 | Kresse | F16H 61/0213 701/56 |
| 2016/0311433 A1* | 10/2016 | Shelton | B60W 30/18072 |
| 2017/0159802 A1* | 6/2017 | Anderson | F16H 61/0213 |
| 2017/0341651 A1* | 11/2017 | Monajemi | F16H 61/0204 |
| 2018/0023691 A1* | 1/2018 | Ota | F16H 61/0204 701/51 |

FOREIGN PATENT DOCUMENTS

| | | |
|---|---|---|
| JP | 2000-110929 A | 4/2000 |
| JP | 2004-314842 A | 11/2004 |

* cited by examiner

*Primary Examiner* — David J Hlavka
(74) *Attorney, Agent, or Firm* — Oliff PLC

(57) ABSTRACT

An electronic control unit updates a target gear shift characteristic value to a target gear shift characteristic value which is set at a gear shift start time with a first predetermined torque based on the first predetermined torque and performs gear shift control from a degree of progress in gear shift based on the updated target gear shift characteristic value, when an input torque becomes equal to or less than the first predetermined torque due to an accelerator returning operation or the like during a gear shift (during a power-on upshift). Accordingly, it is possible to perform stable gear shift control to cope with a decrease in input torque during the gear shift and to suppress occurrence of a shock.

5 Claims, 6 Drawing Sheets

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

CONTROL DEVICE FOR VEHICLE AND CONTROL METHOD FOR VEHICLE

INCORPORATION BY REFERENCE

The disclosure of Japanese Patent Application No. 2016-141133 filed on Jul. 19, 2016 including the specification, drawings and abstract is incorporated herein by reference in its entirety.

BACKGROUND

1. Technical Field

The disclosure relates to a control device for a vehicle and a control method for a vehicle.

2. Description of Related Art

A technique of reducing a gear shift shock by torque-down control of a power source in gear shift control of a stepped type automatic transmission is described in Japanese Patent Application Publication No. 2004-314842 (JP 2004-314842 A)).

In the technique described in JP 2004-314842 A, an engagement capacity of gear-shift friction elements in the automatic transmission is corrected by an unnecessary value less than a lower-limit torque value of a power source, among target power sources to be achieved by the torque down, using feedforward control. The automatic transmission is configured to reduce a gear shift shock by engagement capacity control of the gear-shift friction elements and torque-down control of the power source in an inertia phase at a gear shift time based on engagement of the gear-shift friction elements.

SUMMARY

In the technique described in JP 2004-314842 A, since the feedforward control is performed at a gear shift start time, it is not possible to cope with a decrease in input torque of the automatic transmission (hereinafter also referred to as an input torque) during a gear shift.

That is, when a non-executable value in the torque-down control is corrected using the engagement capacity of the friction elements with respect to the decrease in input torque during the gear shift and the gear shift control based on a target gear shift characteristic value (a gear shift target value) set at a gear shift start time is performed, a degree of correction in the engagement capacity of the friction elements increases excessively due to an increase in non-executable values based on the torque-down control. Accordingly, a shock accompanying a push-out feeling occurs in spite of a decrease in input torque (a decrease due to an accelerator returning operation or the like).

The disclosure is for suppressing occurrence of a shock even when an input torque decreases during a gear shift of an automatic transmission.

A first aspect of the disclosure is a control device for a vehicle. The vehicle includes an automatic transmission and an electronic control unit. The automatic transmission includes a plurality of frictional engagement elements and is configured to establish one shift stage of a plurality of shift stages by selectively engaging the plurality of frictional engagement elements with each other. The electronic control unit is configured to perform gear shift control corresponding to a degree of progress in gear shift based on a target gear shift characteristic value. The target gear shift characteristic value is a value corresponding to an input torque of the automatic transmission at a gear shift start time. When the electronic control unit determines that the input torque becomes equal to or less than a first predetermined torque during a gear shift of the automatic transmission, the electronic control unit is configured to update the target gear shift characteristic value to a first target value and configured to perform the gear shift control from the degree of progress in gear shift at a first updating time based on the first target value. The first predetermined torque is an input torque that is less by a predetermined torque than the input torque at the gear shift start time. The first target value is a value of the target gear shift characteristic value that is set when the gear shift starts with the first predetermined torque. The first updating time is a time at which the target gear shift characteristic value is updated to the first target value.

With the foregoing configuration, when the input torque becomes the first predetermined torque that is less by a predetermined torque than that at the gear shift start time due to an accelerator returning operation or the like during the gear shift, the target gear shift characteristic value is updated to the first target value based on the first predetermined torque, and the gear shift control corresponding to the degree of progress in gear shift at the first updating time is performed based on the first target value. Accordingly, it is possible to perform stable gear shift control to cope with a decrease in input torque during the gear shift. As a result, even when the input torque decreases during the gear shift of the automatic transmission, it is possible to suppress occurrence of a shock.

In the control device for the vehicle, during one operation of gear shift of the automatic transmission, the electronic control unit may be configured to update the target gear shift characteristic value to a second target value and to perform the gear shift control from the degree of progress in gear shift at a second updating time based on the second target value when the electronic control unit determines that the input torque becomes equal to or less than a second predetermined torque after the input torque at the gear shift start time has become equal to or less than the first predetermined torque. The second predetermined torque may be an input torque that is less by the predetermined torque than the first predetermined torque. The second target value may be a value of the target gear shift characteristic value that is set when the electronic control unit determines that the gear shift starts with the second predetermined torque. The second updating time may be a time at which the target gear shift characteristic value is updated to the second target value.

With the foregoing configuration, when the decrease in input torque during the gear shift is large, the target gear shift characteristic value is updated multiple times during one operation of gear shift. Accordingly, even when the decrease in input torque is large, it is possible to continuously perform stable gear shift control during the gear shift and to suppress occurrence of a shock.

In the control device for the vehicle, the degree of progress in gear shift may be a degree of delivery of torque between an engagement-side clutch and a disengagement-side clutch of the frictional engagement elements during the gear shift. The degree of progress in gear shift may be 0% at the gear shift start time and may be 100% at a gear shift end time.

In the control device for the vehicle, the target gear shift characteristic value may be a value based on one of a target value of a shifting time and a target value of a driving force of the vehicle.

A second aspect of the disclosure is a control method for a vehicle. The vehicle includes an automatic transmission and an electronic control unit. The automatic transmission includes a plurality of frictional engagement elements and is configured to establish one shift stage of a plurality of shift stages by selectively engaging the plurality of frictional engagement elements with each other. The control method includes: performing, by the electronic control unit, gear shift control corresponding to a degree of progress in gear shift based on a target gear shift characteristic value; and when the electronic control unit determines that the input torque becomes equal to or less than a first predetermined torque during a gear shift of the automatic transmission, updating, by the electronic control unit, the target gear shift characteristic value to a first target value and performing, by the electronic control unit, the gear shift control from the degree of progress in gear shift at a first updating time based on the first target value. The target gear shift characteristic value is a value corresponding to an input torque of the automatic transmission at a gear shift start time. The first predetermined torque is an input torque that is less by a predetermined torque than the input torque at the gear shift start time. The first target value is a value of the target gear shift characteristic value that is set when the gear shift starts with the first predetermined torque. The first updating time is a time at which the target gear shift characteristic value is updated to the first target value.

With the foregoing configurations, it is possible to prevent occurrence of a shock even when an input torque decreases during a gear shift of an automatic transmission.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings.

First, a vehicle 100 according to this embodiment will be described below with reference to FIGS. 1 to 4.

Figure 1:
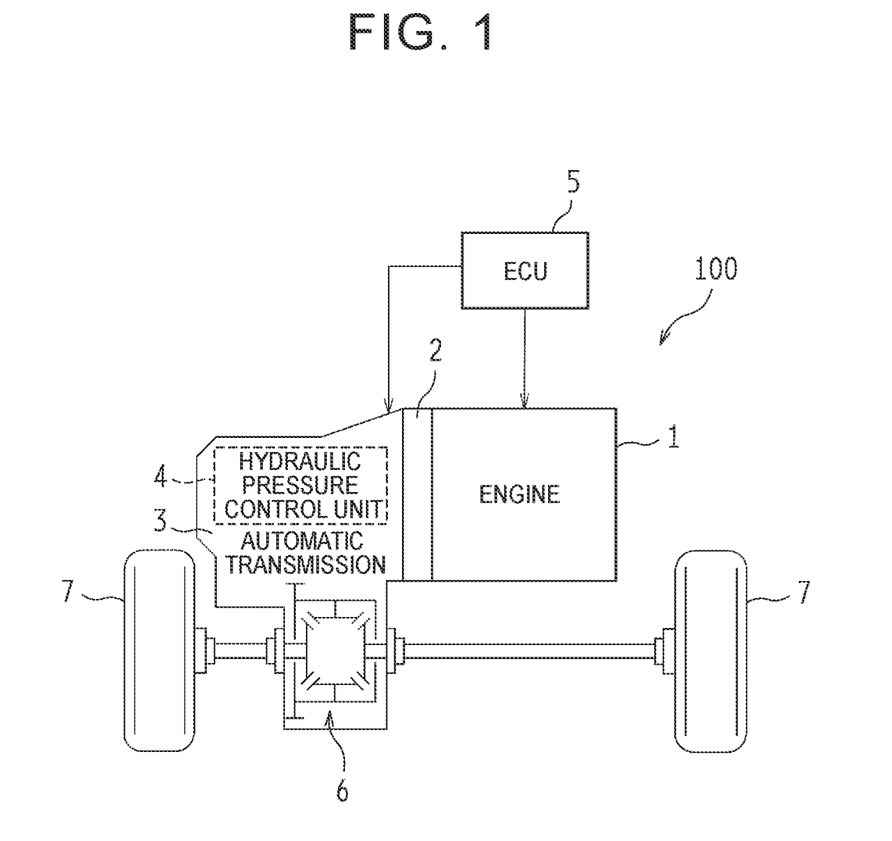
FIG. 1 is a diagram schematically illustrating a configuration of a vehicle equipped with an automatic transmission according to the disclosure.

As illustrated in FIG. 1, the vehicle 100 includes an engine 1, a torque converter 2, an automatic transmission 3, a hydraulic pressure control unit 4, and an electronic control unit (ECU) 5. The vehicle 100 is, for example, of a front engine-front drive (FF) type and is configured such that an output of the engine 1 is transmitted to a differential device 6 via the torque converter 2 and the automatic transmission 3 and is assigned to right and left driving wheels (front wheels) 7.

The engine (internal combustion engine) 1 is a driving force source for traveling and is, for example, a multi-cylinder gasoline engine. The engine 1 is configured such that an operation state thereof can be controlled based on a throttle opening level (an amount of intake air) of a throttle valve, an amount of fuel injected, an ignition timing, and the like.

Figure 2:
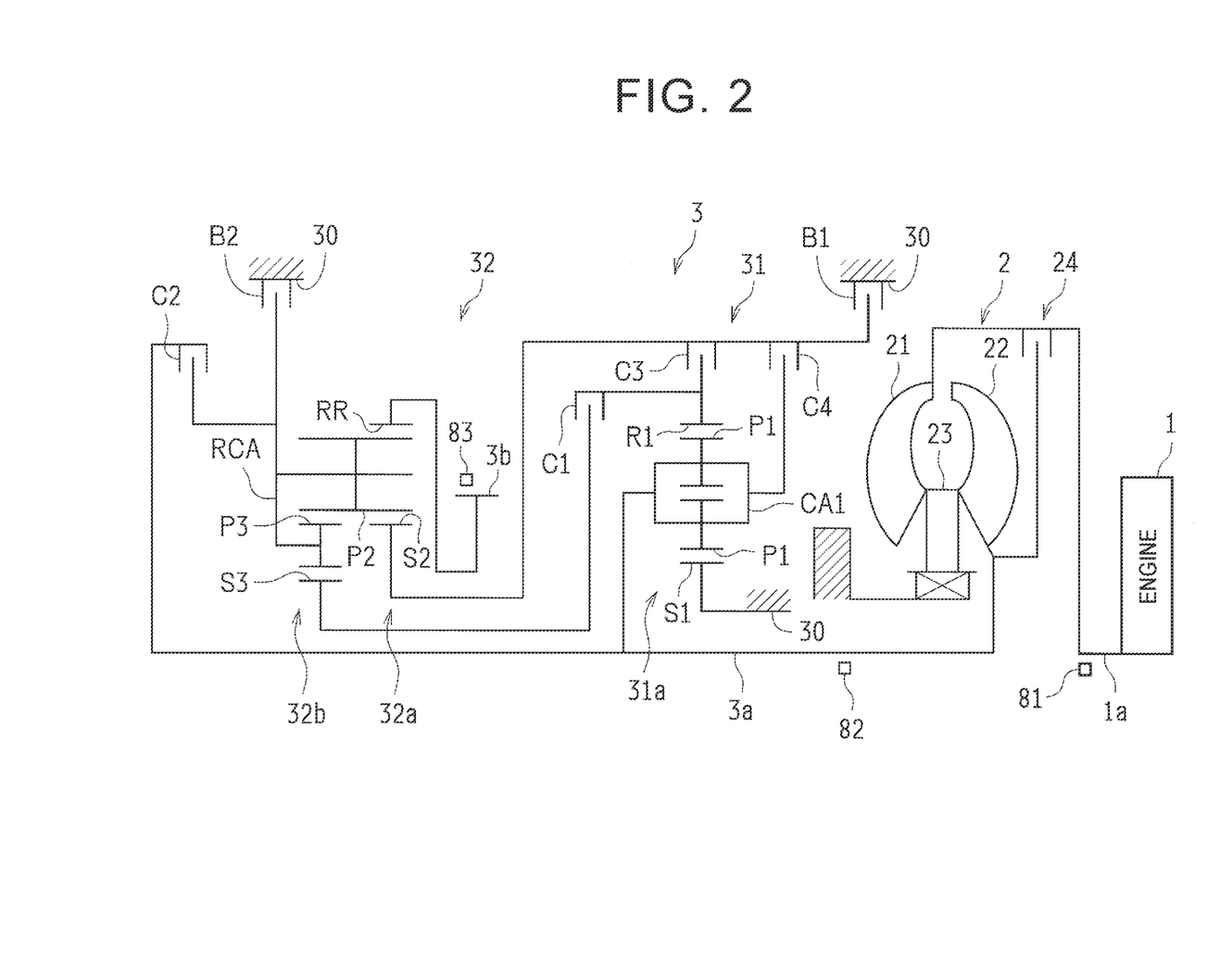
FIG. 2 is a skeleton diagram illustrating a configuration of a torque converter and the automatic transmission.

As illustrated in FIG. 2, the torque converter 2 includes a pump impeller 21 that is connected to a crank shaft 1a which is an output shaft of the engine 1, a turbine runner 22 that is connected to the automatic transmission 3, a stator 23 that has a torque amplifying function, and a lock-up clutch 24 that directly connects the engine 1 and the automatic transmission 3 to each other. In FIG. 2, a lower half below a rotation axis of the torque converter 2 and the automatic transmission 3 is omitted and only an upper half is schematically illustrated.

The automatic transmission 3 is disposed in a power transmission path between the engine 1 and the driving wheels 7 and is configured to change a rotation speed of an input shaft 3a and to output the changed rotation speed to an output shaft 3b. In the automatic transmission 3, the input shaft 3a is connected to the turbine runner 22 of the torque converter 2, and the output shaft 3b is connected to the driving wheels 7 via the differential device 6 or the like.

The automatic transmission 3 includes a first gear shift unit (a front planetary) 31 that includes a first planetary gear mechanism 31a as a main element, a second gear shift unit (a rear planetary) 32 that includes a second planetary gear mechanism 32a and a third planetary gear mechanism 32b as a main element, first to fourth clutches C1 to C4, a first brake B1, and a second brake B2.

The first planetary gear mechanism 31a constituting the first gear shift unit 31 is a double pinion type planetary gear mechanism and includes a sun gear S1, a plurality of pairs of pinion gears P1 that engage with each other, a planetary carrier CA1 that supports the pinion gears P1 such that they can rotate and revolve, and a ring gear R1 that engages with the sun gear S1 via the pinion gears P1.

The planetary carrier CA1 is connected to the input shaft 3a and integrally rotates along with the input shaft 3a. The sun gear S1 is fixed to a transmission case 30 and is not rotatable. The ring gear R1 serves as an intermediate output member and reduces the rotation speed of the input shaft 3a and transmits the reduced rotation speed to the second gear shift unit 32.

The second planetary gear mechanism 32a constituting the second gear shift unit 32 is a single pinion type planetary gear mechanism and includes a sun gear S2, a pinion gear P2, a planetary carrier RCA that supports the pinion gear P2 such that it can rotate and revolve, and a ring gear RR that engages with the sun gear S2 via the pinion gear P2.

The third planetary gear mechanism 32b constituting the second gear shift unit 32 is a double pinion type planetary gear mechanism and includes a sun gear S3, a plurality of pairs of pinion gears P2 and P3 that engage with each other, a planetary carrier RCA that supports the pinion gears P2 and P3 such that they can rotate and revolve, and a ring gear RR that engages with the sun gear S3 via the pinion gears P2 and P3. The planetary carrier RCA and the ring gear RR are shared by the second planetary gear mechanism 32a and the third planetary gear mechanism 32b.

The sun gear S2 is selectively connected to the transmission case 30 by the first brake B1. The sun gear S2 is selectively connected to the ring gear R1 via the third clutch C3. The sun gear S2 is further selectively connected to the planetary carrier CA1 via the fourth clutch C4. The sun gear S3 is selectively connected to the ring gear R1 via the first clutch C1. The planetary carrier RCA is selectively connected to the transmission case 30 by the second brake B2. The planetary carrier RCA is selectively connected to the input shaft 3a via the second clutch C2. The ring gear RR is connected to the output shaft 3b and integrally rotates along with the output shaft 3b.

The first to fourth clutches C1 to C4, the first brake B1, and the second brake B2 are frictional engagement elements that are frictionally engaged by a hydraulic actuator and are controlled by the hydraulic pressure control unit 4 and the ECU 5.

Figure 3:
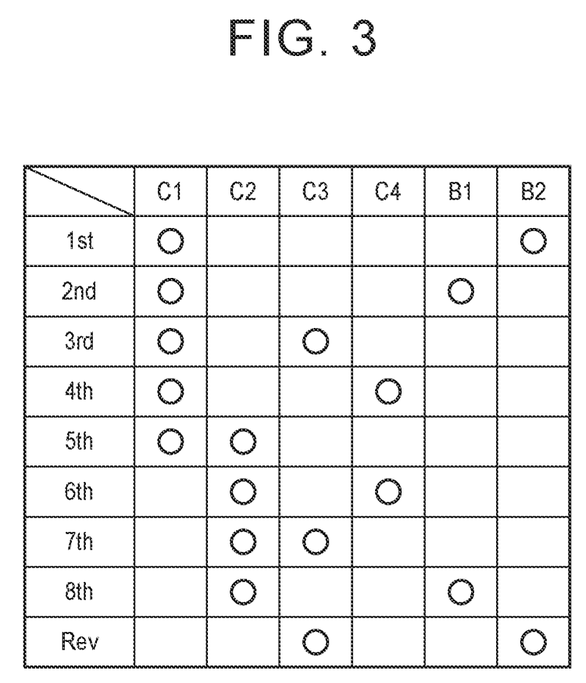
FIG. 3 is an engagement table illustrating engagement states of first to fourth clutches, a first brake, and a second brake for each shift stage in the automatic transmission.

FIG. 3 is an engagement table illustrating engaged states or disengaged states of the first to fourth clutches C1 to C4, the first brake B1, and the second brake B2 for each shift stage (each gear stage). In the engagement table illustrated in FIG. 3, mark O denotes an "engaged state" and a blank denotes a "disengaged state."

As illustrated in FIG. 3, in the automatic transmission 3 according to this embodiment, the first clutch C1 and the second brake B2 each engage to set a first shift stage (1st) having a largest gear ratio (the rotation speed of the input shaft 3a/the rotation speed of the output shaft 3b). The first clutch C1 and the first brake B1 each engage to set a second shift stage (2nd).

The first clutch C1 and the third clutch C3 each engage to set a third shift stage (3rd). The first clutch C1 and the fourth clutch C4 each engage to set a fourth shift stage (4th).

The first clutch C1 and the second clutch C2 each engage to set a fifth shift stage (5th). The second clutch C2 and the fourth clutch C4 each engage to set a sixth shift stage (6th).

The second clutch C2 and the third clutch C3 each engage to set a seventh shift stage (7th). The second clutch C2 and the first brake B1 each engage to set an eighth shift stage (8th). The third clutch C3 and the second brake B2 each engage to set a reverse shift stage (Rev).

The hydraulic pressure control unit 4 controls engagement and disengagement of a plurality of frictional engagement elements (the clutches C1 to C4 and the brakes B1 and B2) of the automatic transmission 3. The hydraulic pressure control unit 4 also has a function of controlling the lock-up clutch 24 of the torque converter 2. The hydraulic pressure control unit 4 includes a hydraulic actuator of each frictional engagement element of the automatic transmission 3 and a linear solenoid valve that supplies a controlled hydraulic pressure to the hydraulic actuators.

Figure 4:
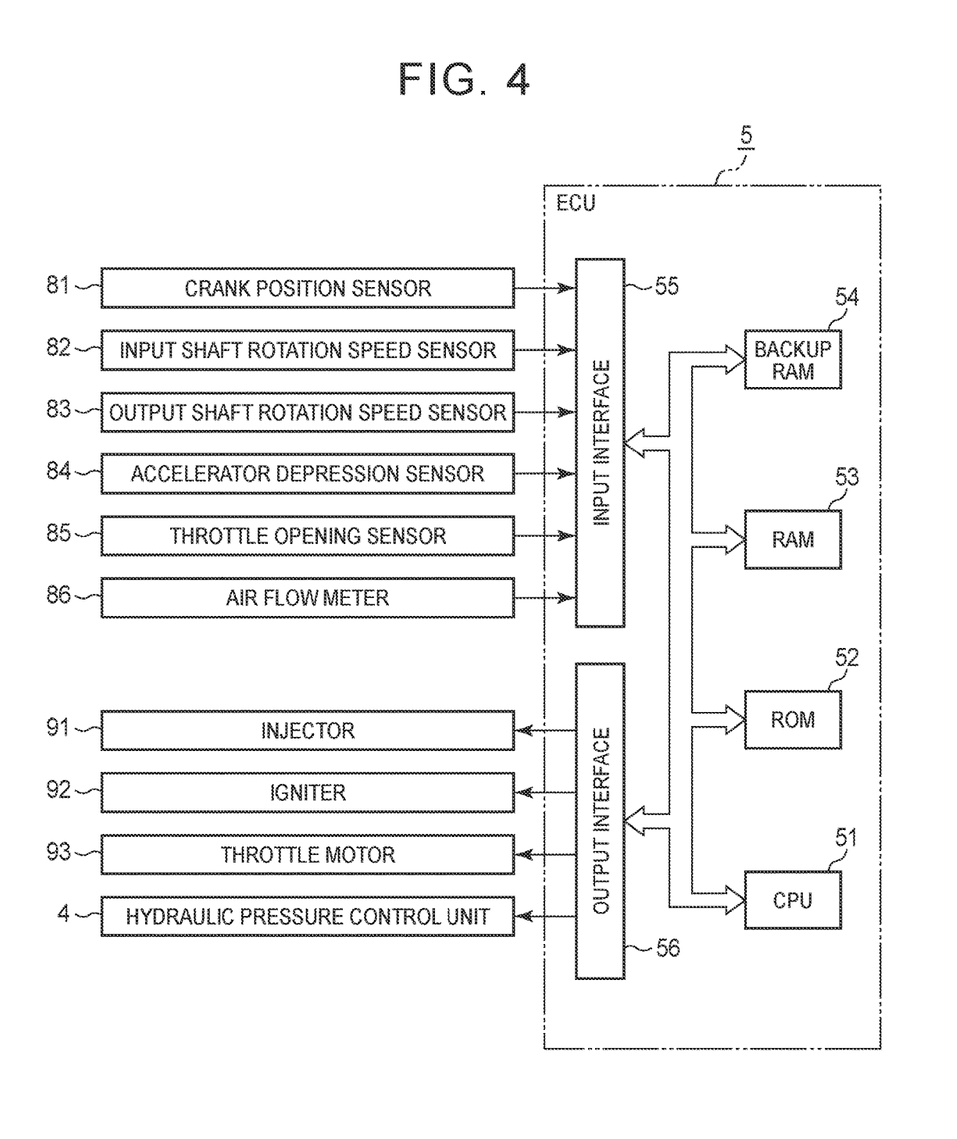
FIG. 4 is a block diagram illustrating a configuration of a control system of the vehicle.

The ECU 5 is configured to perform operation control of the engine 1, gear shift control of the automatic transmission 3, and the like. Specifically, as illustrated in FIG. 4, the ECU 5 includes a CPU 51, a ROM 52, a RAM 53, a backup RAM 54, an input interface 55, and an output interface 56.

The CPU 51 performs an arithmetic process based on various control programs or maps stored in the ROM 52. In the ROM 52, various control programs, maps which are referred to when the control programs are executed, and the like are stored. The RAM 53 is a memory that temporarily stores process results of the CPU 51, detection results of various sensors, and the like. The backup RAM 54 is a nonvolatile memory that stores data to be stored when the ignition is turned off.

The input interface 55 is connected to a crank position sensor 81, an input shaft rotation speed sensor 82, an output shaft rotation speed sensor 83, an accelerator depression sensor 84, a throttle opening sensor 85, an air flow meter 86, and the like.

The crank position sensor 81 is provided to calculate a rotation speed of the engine 1. The input shaft rotation speed sensor 82 is provided to calculate a rotation speed of the input shaft 3a (a turbine rotation speed) of the automatic transmission 3. The output shaft rotation speed sensor 83 is provided to calculate a rotation speed of the output shaft 3b of the automatic transmission 3. A vehicle speed can be calculated from the rotation speed of the output shaft 3b. The accelerator depression sensor 84 is provided to detect an accelerator depression amount which is a depression amount (an operation amount) of an accelerator pedal. The throttle opening sensor 85 is provided to detect a throttle opening level of a throttle valve. The air flow meter 86 is provided to detect an amount of intake air of the engine 1.

The output interface 56 is connected to an injector 91, an igniter 92, a throttle motor 93, the hydraulic pressure control unit 4, and the like. The injector 91 is a fuel injection valve and an amount of fuel injected therefrom can be adjusted. The igniter 92 is provided to adjust an ignition timing using an ignition plug. The throttle motor 93 is provided to adjust the throttle opening level of the throttle valve.

The ECU 5 is configured to control the operation state of the engine 1 by controlling the throttle opening level, the amount of fuel injected, and the ignition timing, and the like based on the detection results of various sensors. The ECU 5 is configured to perform gear shift control of the automatic transmission 3 and control of the lock-up clutch 24 of the torque converter 2 by controlling the hydraulic pressure control unit 4.

In the gear shift control by the ECU 5, a required shift stage is set, for example, based on a gear shift map with the vehicle speed and the accelerator depression amount as parameters, and the hydraulic pressure control unit 4 is controlled such that an actual shift stage is the required shift stage. The gear shift map is a map in which a plurality of areas for calculating an appropriate shift stage (one of the 1st to 8th shift stages having optimal efficiency) are set depending on the vehicle speed and the accelerator depression amount, and is stored in the ROM 52 of the ECU 5. A plurality of shift lines for defining the areas (upshift lines and downshift lines for defining the shift areas of the 1st to 8th shift stages) are set in the gear shift map.

The ECU 5 performs gear shift control corresponding to a degree of progress in gear shift (a degree of progress in gear shift control) based on a target gear shift characteristic value to be described later. The ECU 5 performs power-on upshift control to be described later.

Before describing control (power-on upshift control) by which this embodiment is characterized, gear shift control for determining a control operation amount by which the target gear shift characteristic value (a gear shift target value) is realized in the automatic transmission 3 will be schematically described below.

As general gear shift control, for example, a technique of determining a torque capacity (or a hydraulic pressure command value) of each frictional engagement element at a gear shift time and performing a gear shift based on a predetermined control map which has been determined in advance by adaptation while evaluating whether a gear shift shock, a shifting time, or the like is appropriate in an actual vehicle is known. In the technique using the control map, it is necessary to prepare a plurality of control maps depending on a gear shift pattern of a power-on downshift, a power-off upshift, or the like and a combination of shift stages before and after the gear shift. Accordingly, greater labor is required for adaptation work as the number of shift stages of the automatic transmission becomes larger.

Therefore, in this embodiment, a technique of performing a gear shift using a gear shift model for determining a control operation amount by which the target gear shift characteristic value is realized is employed as the gear shift control instead of the technique using the control map. The target gear shift characteristic value is a target value of a factor (such as a shifting time or a driving force) for determining a change in mode to be realized at the time of a gear shift. The control operation amount is a value required during operation for a factor (such as an engine torque or a clutch torque) to reach a control target.

Gear shift control using a gear shift model will be described below. Equations of motion during the gear shift are expressed by Equations (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

Equations (1) and (2) are derived from equations of motion of connected rotary elements constituting the automatic transmission 3 and relational expressions of planetary gear mechanisms constituting the automatic transmission 3. The equation of motion of each rotary element is an equation of motion in which a torque which is expressed by a product of a moment of inertia and a change rate of a rotation speed in each rotary element is defined by a torque acting on a member associated with the rotary element among three members of the planetary gear mechanism and both members of each frictional engagement element. The relational expressions in each planetary gear mechanism are relational expressions in which a torque relationship between three members and a relationship in rotation speed change rate in the planetary gear mechanism are defined using a gear ratio of the planetary gear mechanism.

In Equations (1) and (2), $d\omega t/dt$ is a derivative with respect to time, that is, a change rate, of a turbine rotation speed (a rotational angular velocity) $\omega t$ (that is, an input shaft rotation speed $\omega i$ of the automatic transmission 3) and denotes an acceleration of the input shaft 3a (an angular acceleration which is hereinafter referred to as input shaft acceleration) as a change in speed of a rotary member on the input shaft 3a side. The input shaft acceleration $d\omega t/dt$ is an example of the input shaft rotation speed change rate. $d\omega o/dt$ is a change rate of an output shaft rotation speed $\omega o$ of the automatic transmission 3 and denotes an output shaft acceleration. Tt denotes a turbine torque which is a torque on the input shaft 3a as a torque on a rotary member on the input shaft 3a side, that is, a transmission input torque Ti. The turbine torque Tt has the same meaning as an engine torque Te (=Tt/t) in consideration of a torque ratio t of the torque converter 2. To denotes a transmission output torque which is a torque on the output shaft 3b as a torque on a rotary member on the output shaft 3b side. Tcapl denotes a torque capacity of a frictional engagement element that performs an engagement operation at the gear shift time (hereinafter referred to as an engagement-side clutch torque). Tcdrn denotes a torque capacity of a frictional engagement element that performs a disengagement operation at the gear shift time (hereinafter referred to as a disengagement-side clutch torque). Here, a1, a2, b1, b2, c1, c2, d1, and d2 are constants when Equations (1) and (2) are derived and are coefficients which are determined in design from the moment of inertia of each rotary element and the gear ratio of the planetary gear mechanism. Specific numerical values of the constants vary, for example, depending on a gear shift type (for example, a gear shift pattern or a combination of shift stages before and after the gear shift). Accordingly, an equation of motion is individual, but equations of motion corresponding to gear shift types in which the constants differ depending on the gear shift type are used for the gear shift of the automatic transmission 3.

Equations (1) and (2) are gear train equations of motion of the automatic transmission 3 which are obtained by formularizing a relationship between the target gear shift characteristic values and the control operation amounts. The target gear shift characteristic values can express target values for the shifting time and the driving force and are handled in the gear train equations of motion. In this embodiment, the input shaft acceleration $d\omega t/dt$ is used as an example of a physical quantity that can express the shifting time. The transmission output torque To is used as an example of a physical quantity that can express the driving force. In this embodiment, the target gear shift characteristic value is set to a target value of the input shaft acceleration $d\omega t/dt$ (a target input shaft rotation speed). The target gear shift characteristic value may be a target value of the shifting time (a target shifting time) or the like.

On the other hand, in this embodiment, the control operation amounts of control for establishing the target gear shift characteristic values (feedback control) are set by three values including the turbine torque Tt (which has the same meaning as the engine torque Te), the engagement-side clutch torque Tcapl, and the disengagement-side clutch torque Tcdrn. Then, since the equations of motion include two equations of Equations (1) and (2) and there are three control operation amounts, the control operation amounts for establishing two target gear shift characteristic values do not have unique solutions. The output shaft acceleration $d\omega o/dt$ in the equations is calculated from the output shaft rotation speed $\omega o$ which is a value detected by the output shaft rotation speed sensor 83.

Therefore, in this embodiment, torque assignment ratios of transmission torques assigned to the disengagement-side clutch and the engagement-side clutch are used as limiting conditions for acquiring solutions of the equations of motion of Equations (1) and (2). By using the torque assignment ratios as the limiting conditions, delivery of a torque (that is, a degree of progress in gear shift) between the disengagement-side clutch and the engagement-side clutch during the gear shift can be incorporated into the equations of motion and the control operation amounts can be uniquely solved.

The torque assignment ratios are ratios of the transmission torques at which a total transmission torque on the input shaft 3a is assigned to both frictional engagement elements when the total transmission torque (a total transmission torque) which needs to be assigned to the disengagement-side clutch and the engagement-side clutch during the gear shift of the automatic transmission 3 is replaced with, for example, the torque on the input shaft 3a (the total transmission torque on the input shaft). The torque assignment ratios are changed depending on the degree of progress in gear shift during the gear shift.

In this embodiment, when the torque assignment ratio of the engagement-side clutch is defined as "xapl" and the torque assignment ratio of the disengagement-side clutch is defined as "xdrn," Equations (3) and (4) are defined as follows using a torque assignment ratio x (for example, $0 \leq x \leq 1$) varying in a time series to reflect delivery of a torque during the gear shift.

$$xapl = x \quad (3)$$

$$xdrn = 1-x \quad (4)$$

The relational expression between the engagement-side clutch torque Tcapl and the disengagement-side clutch torque Tcdrn can be defined using "x" (=xapl) and "1−x" (=xdrn) based on "Tcapl" and "Tcdrn" replaced with the torque on the input shaft $3a$ and Equations (3) and (4). The relational expressions for calculating the turbine torque Tt, the engagement-side clutch torque Tcapl, and the disengagement-side clutch torque Tcdrn which are the control operation amounts are derived from Equations (1) and (2) and the relational expression between "Tcapl" and "Tcdrn." The turbine torque Tt (which has the same meaning as the engine torque Te) is expressed by a relational expression using "x" (=xapl), "1−x" (=xdrn), the input shaft acceleration dωt/dt, the transmission output torque To, and the like. Similarly, the engagement-side clutch torque Tcapl is expressed by a relational expression using "x" (=xapl), the input shaft acceleration dωt/dt, the transmission output torque To, and the like. Similarly, the disengagement-side clutch torque Tcdrn is expressed by a relational expression using "1−x" (=xdrn), the input shaft acceleration dωt/dt, the transmission output torque To, and the like.

That is, a gear shift model in this embodiment is for calculating the control operation amounts based on the target gear shift characteristic values using the equations of motion (Equations (1) and (2)) of the automatic transmission 3 including the target gear shift characteristic values and the control operation amounts and the relationships (Equations (3) and (4)) indicating the torque assignment ratios. In this way, in this embodiment, the gear shift of the automatic transmission 3 is performed using the gear shift model by adding the limiting conditions set with the torque assignment ratio x to Equations (1) and (2). Accordingly, even when three control operation amounts are present for two target gear shift characteristic values, three control operation amounts can be appropriately determined using the gear shift model. Since an equation of motion is individual but gear train equations of motion in which the constants differ depending on the gear shift type (for example, the gear shift pattern or the combination of shift stages before and after the gear shift) are used as described above, the gear shift models corresponding to the gear shift types are used for the gear shift of the automatic transmission 3.

The ECU 5 calculates the target gear shift characteristic values and the control operation amounts depending on the degree of progress in gear shift for each gear shift pattern. Examples of the gear shift pattern include power-on upshift, power-off upshift, power-on downshift, and power-off downshift.

For example, in a case of the power-on upshift, when hydraulic pressure control for the frictional engagement elements corresponding to a target shift stage is started, the gear shift pattern progresses to a step of torque phase in which the assignment ratios of the required torque capacities of the frictional engagement elements vary, progresses to a step of inertia phase in which the gear ratio of the automatic transmission 3 varies, and progresses to a step of gear shift end. That is, the gear shift of the automatic transmission 3 progresses through a step before torque phase, the step of torque phase, the step of inertia phase, and the step of gear shift end.

A map or the like in which suitable torque assignment ratios varying with the progress in gear shift are set depending on the degree of progress in gear shift for each gear shift pattern is prepared in advance by experiment, simulation, or the like, and is stored in the ROM 52 of the ECU 5. The ECU 5 reads the torque assignment ratios corresponding to the degree of progress in gear shift at the time of gear shift control, applies the read torque assignment ratios along with the target gear shift characteristic values to the gear shift model, and calculates the control operation amounts (such as a required input torque of the input shaft $3a$ and required torque capacities of an engagement-side frictional engagement element and a disengagement-side frictional engagement element).

The ECU 5 performs control of the engagement-side frictional engagement element and the disengagement-side frictional engagement element (hydraulic pressure control) depending on the degree of progress in gear shift such that the required torque capacity is obtained. The ECU 5 performs the gear shift control such that the actual input shaft rotation speed reaches the target input shaft rotation speed depending on the degree of progress in gear shift based on the target gear shift characteristic values.

The power-on upshift control which is performed by the ECU 5 will be described below.

First, in the power-on upshift control, a shock is suppressed by cancelling out the inertia torque generated during the gear shift using the torque-down control. For example, in the related art, an engagement capacity of the gear-shift friction elements is corrected by an unnecessary value less than a lower-limit torque value of a power source, among a target power source to be achieved by the torque down, using feedforward control.

When gear shift control is performed based on the target gear shift characteristic values which have been determined at the gear shift start time and the transmission input torque (hereinafter also referred to as an input torque) decreases (decreases due to an accelerator returning operation or the like) during the power-on upshift, an amount of torque decreased required for realizing the target input shaft rotation speed becomes excessive with respect to the decreased input torque. Accordingly, a proportion of the amount of torque decreased at which the torque-down control is not executable increases.

When the input torque decreases during the power-on upshift in this way, the correction values for the clutch torques of the clutches in the automatic transmission become excessive as described above in the related art. Accordingly, a shock accompanying a push-out feeling may occur in spite of the decrease in input torque.

When the amount of torque decreased at which the torque-down control is not executable becomes equal to or greater than a predetermined value, it is conceivable that a shock is suppressed by limiting the correction values for the clutch torques or prohibiting correction of the clutch torques. However, in this case, since an actual shifting time becomes longer than a target shifting time, the clutch torques are eventually corrected by the feedback control and it is thus difficult to stably suppress occurrence of the shock.

In order to solve the above-mentioned problem, in this embodiment, control capable of preventing occurrence of a shock even when the input torque decreases due to an accelerator returning operation or the like during the power-on upshift is realized.

An example of the power-on upshift control will be described below with reference to the flowchart illustrated in FIG. 5 and the timing chart illustrated in FIG. 6. The control routine illustrated in FIG. 5 is repeatedly performed at predetermined intervals by the ECU 5.

Figure 5:
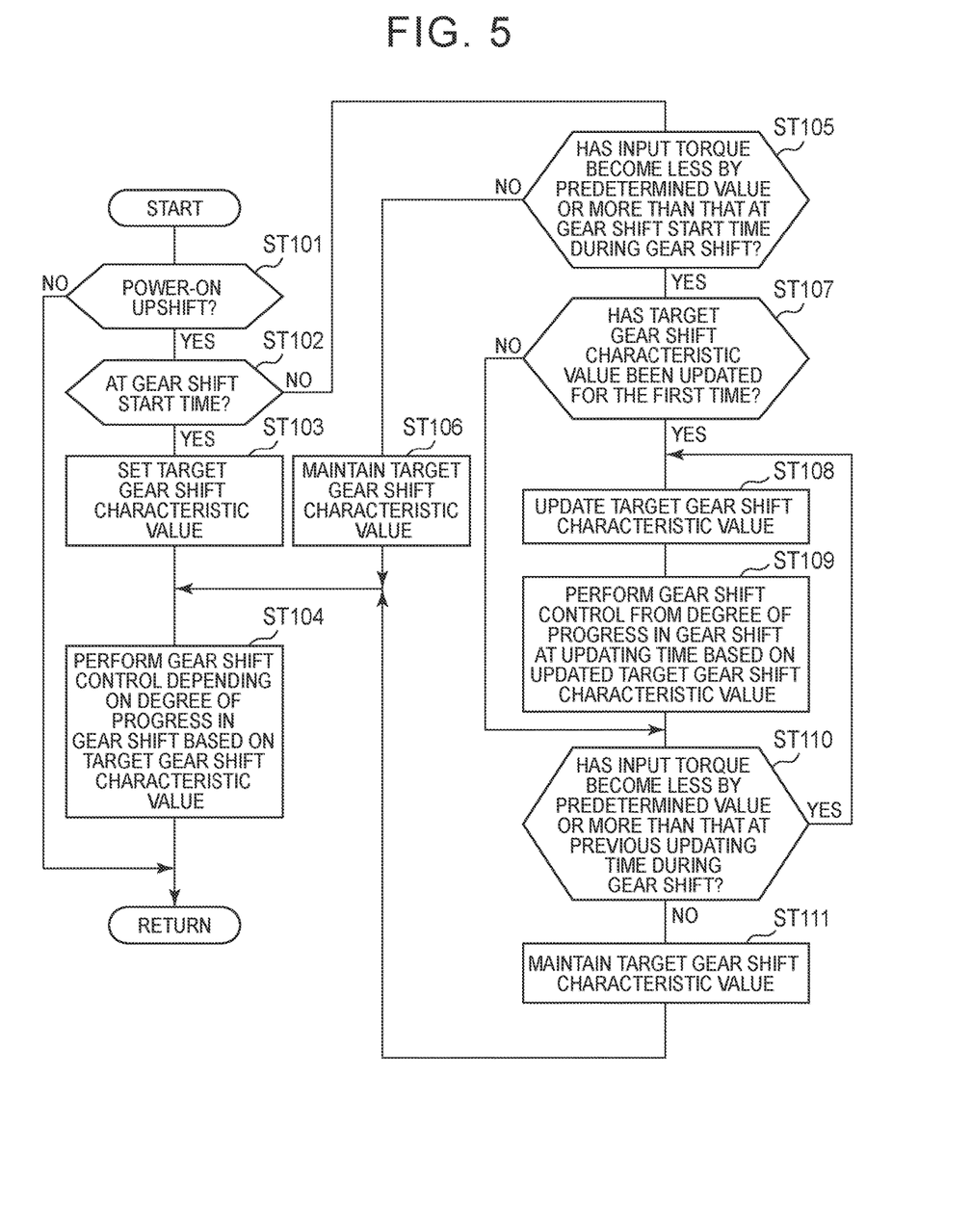
FIG. 5 is a flowchart illustrating an example of power-on upshift control which is performed by an electronic control unit.

While performing the control routine illustrated in FIG. 5, the ECU 5 sequentially calculates the input torque of the automatic transmission 3. Specifically, the ECU 5 calculates an engine torque based on an amount of intake air acquired from an output signal of the air flow meter 86, the ignition timing of the engine 1, or the like, and calculates the input torque by multiplying the calculated engine torque by a torque ratio t of the torque converter 2. Regarding the input torque, a torque sensor may be disposed in the crank shaft 1a of the engine 1 or the input shaft 3a of the automatic transmission 3 and the input torque may be calculated based on an output signal of the torque sensor.

When the control routine illustrated in FIG. 5 starts, it is determined in Step ST101 whether a gear shift request of the automatic transmission 3 has been given and whether the gear shift is a power-on upshift. When the determination result is negative (NO), the control routine restarts. When the determination result of Step ST101 is positive (YES), the control routine transitions to Step ST102.

In Step ST102, it is determined whether a gear shift start time has been reached. When the determination result is positive (YES) (when it is determined that the gear shift start time has been reached), the control routine transitions to Step ST103. When the determination result of Step ST102 is negative (NO), the control routine will be described later.

In Step ST103, the target gear shift characteristic value at the gear shift start time is set. Setting of the target gear shift characteristic value will be described below.

In this embodiment, a target value of the input shaft acceleration dωt/dt (a target input shaft acceleration) in Equation (1) of the equations of motion is set as the target gear shift characteristic value. The target input shaft acceleration is set depending on vehicle conditions. Specifically, the target input shaft acceleration is set with reference to the target input shaft acceleration map based on the input torque and the vehicle speed (which is calculated from the output signal of the output shaft rotation speed sensor 83) at the gear shift start time. The target input shaft acceleration map is a map in which the target input shaft acceleration required depending on the input torque and the vehicle speed is set in advance by experiment, simulation, or the like using the input torque and the vehicle speed indicating the vehicle conditions as parameters, and is stored in the ROM 52 of the ECU 5. Hereinafter, the target input shaft acceleration is referred to as a target gear shift characteristic value.

Then, in Step ST104, the gear shift control (the power-on upshift control) corresponding to the degree of progress in gear shift is performed based on the target gear shift characteristic value (the target gear shift characteristic value corresponding to the input torque at the gear shift start time) set in Step ST103. Thereafter, the control routine restarts.

On the other hand, when the determination result of Step ST102 is negative (NO), it is determined that the gear shift of the power-on upshift is being performed and the control routine transitions to Step ST105.

In Step ST105, it is determined whether the input torque has become less by a predetermined value (Tht) or more than the input torque at the gear shift start time during the gear shift. Specifically, a decrease in input torque ΔTi at the gear shift start time t1 illustrated in FIG. 6 is equal to or greater than the predetermined value Tht.

Regarding the predetermined value Tht which is used for determination of Step ST105, for example, when the input torque decreases during the power-on upshift, a decrease in input torque (the decrease in input torque from that at the gear shift start time) in which the shock occurs is calculated in advance by experiment, simulation, or the like. A value obtained by adding a margin to the decrease in input torque (an allowable value) in which the shock will not occur when the input torque decreases during the power-on upshift is set as the predetermined value Tht based on the results of experiment, simulation, or the like.

When the determination result of Step ST105 is negative (NO) (when "the decrease in input torque ΔTi from that at the gear shift start time<Tht" is satisfied), the target gear shift characteristic value is maintained (Step ST106) and the control routine returns to Step ST104. In Step ST104, the gear shift control corresponding to the degree of progress in gear shift is performed based on the maintained target gear shift characteristic value. Thereafter, the control routine restarts.

On the other hand, when the determination result of Step ST105 is positive (YES), that is, when the decrease in input torque ΔTi from that at the gear shift start time is equal to or greater than the predetermined value Tht, the control routine transitions to Step ST107.

In Step ST107, it is determined whether the target gear shift characteristic value has been updated for the first time. When the determination result thereof is positive (YES) (when the target gear shift characteristic value has been updated for the first time), the control routine transitions to Step S108. When the determination result of Step ST107 is negative (NO) (when the target gear shift characteristic value has been updated for the second time or more), the control routine transitions to Step ST110.

In Step ST108, a time point at which the determination result of Step ST105 is positive (YES), that is, a time point at which the decrease in input torque ΔTi from that at the gear shift start time is equal to or greater than the predetermined value Tht (time point t2 in FIG. 6), is used as an updating time and the target gear shift characteristic value is updated at that time.

Figure 6:
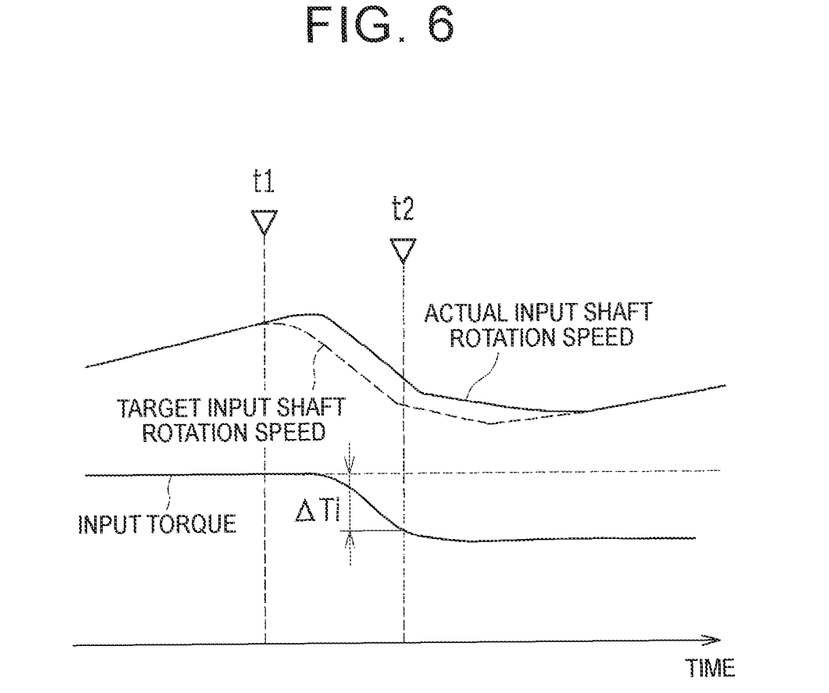
FIG. 6 is a timing chart illustrating an example of changes in a target input shaft rotation speed, an actual input shaft rotation speed, and an input torque when the power-on upshift control is performed.

The updating of the target gear shift characteristic value in Step ST108 is performed based on the input torque at the updating time (time point t2 in FIG. 6). Specifically, the target gear shift characteristic value is updated in a process of updating the target gear shift characteristic value to a target gear shift characteristic value in the gear shift control (a target input shaft acceleration which is acquired in the same process as in Step ST103) which is performed when the gear shift is started with the input torque at the updating time (a low input torque). By updating the target gear shift characteristic value in this way, the same control as the gear shift control starting in a stable input torque state on a low torque side can be performed for the correction function such as feedback control.

In Step ST109, the gear shift control is performed from the degree of progress in gear shift at the updating time based on the target gear shift characteristic value updated in Step ST108. For example, when the target gear shift characteristic value is updated at the degree of progress in gear shift of 50%, the gear shift control starts at the time point at which the degree of progress in gear shift is 50% based on the target gear shift characteristic value at the degree of progress in gear shift of 50% (the target gear shift characteristic value after being updated). The degree of progress in gear shift is 0% at the gear shift start time and is 100% at the gear shift end time.

Then, in Step ST110, it is determined whether the input torque has become less by the predetermined value (Tht) or more than that at the previous updating time during the gear shift (one instance of gear shift) (it is determined whether the decrease in input torque from that at the previous updating time is equal to or greater than the predetermined value Tht). The predetermined value Tht which is used for the determination of Step ST110 is assumed to be the same as the value used for the determination of Step ST105.

When the determination result of Step ST110 is positive (YES), that is, when the input torque has decreased further after the target gear shift characteristic value has been updated for the first time and the input torque has become less by the predetermined value (Tht) or more than that at the updating time (at the previous updating time) during one instance of gear shift (when "the decrease in input torque from that at the previous updating time Tht" is satisfied), the control routine returns to Step ST108 and the target gear shift characteristic value is re-updated. Specifically, the target gear shift characteristic value is updated in a process of updating the target gear shift characteristic value to a target gear shift characteristic value in the gear shift control (a target input shaft acceleration which is acquired in the same process as in Step ST103) which is performed when the gear shift starts with the input torque at the re-updating time (a low input torque). Then, in Step ST109, the gear shift control is performed from the degree of progress in gear shift at the re-updating time based on the target gear shift characteristic value re-updated in Step ST108.

The re-updating process and the gear shift control process (the processes of Step ST110 and Steps ST108 to ST109) described above may be performed multiple times during one instance of gear shift.

On the other hand, when the determination result of Step ST110 is negative (NO) (when "the decrease in input torque from that at the previous updating time<Tht" is satisfied), the target gear shift characteristic value is maintained (Step ST111) and the control routine returns to Step ST104. In Step ST104, the gear shift control corresponding to the degree of progress in gear shift is performed based on the maintained target gear shift characteristic value. Thereafter, the control routine restarts.

As described above, according to this embodiment, when the input torque becomes less by a predetermined value or more than that at the gear shift start time due to an accelerator returning operation or the like during the power-on upshift, the target gear shift characteristic value is updated based on the input torque at the time point at which the input torque becomes less by the predetermined value or more, and the gear shift control is performed from the degree of progress in gear shift at the updating time based on the updated target gear shift characteristic value. By this control, it is possible to perform stable gear shift control to cope with the decrease in input torque during the power-on upshift. Accordingly, it is possible to suppress occurrence of a shock accompanying a push-out feeling.

In this embodiment, when the input torque becomes less by the predetermined value or more than that at the updating time after the target gear shift characteristic value has been updated during one instance of gear shift of the automatic transmission 3, the target gear shift characteristic value is re-updated and the gear shift control is performed from the degree of progress in gear shift at the re-updating time based on the re-updated target gear shift characteristic value. By this control, when the decrease in input torque during the power-on upshift is large, the target gear shift characteristic value is updated multiple times during one instance of power-on upshift (during the gear shift). Accordingly, for example, even when the decrease in input torque becomes large due to an accelerator returning operation at a high vehicle speed, it is possible to continuously perform stable gear shift control during the power-on upshift and to suppress occurrence of a shock.

The above-disclosed embodiment is exemplary in all respects and does not serve as a basis of restrictive analysis. The technical scope of the disclosure is not construed by only the above-mentioned embodiment, and is defined by SUMMARY. The technical scope of the disclosure includes all modifications within a meaning and a range equivalent to SUMMARY.

The above-mentioned embodiment describes an example in which the disclosure is applied to the power-on upshift control. However, the disclosure is not limited thereto and the disclosure can be applied to control when an input torque decreases during a gear shift in another gear shift control.

The above-mentioned embodiment describes an example in which the disclosure is applied to the control of the automatic transmission 3 with eight forward stages. However, the disclosure is not limited thereto and the disclosure can be applied to control of an automatic transmission with seven or less forward stages or nine or more forward stages.

The above-mentioned embodiment describes an example in which the vehicle 100 is of an FF type. However, the disclosure is not limited thereto and the vehicle may be of a front engine-rear drive (FR) type or of a four-wheel driven type.

The above-mentioned embodiment describes an example in which the engine 1 is a multi-cylinder gasoline engine, but the disclosure is not limited thereto. The engine may be a diesel engine or the like.

In the above-mentioned embodiment, the ECU 5 may be constituted by a plurality of ECUs.

The disclosure can be effectively used for a controller for a vehicle including a stepped type automatic transmission in which a plurality of shift stages are set by selectively causing a plurality of frictional engagement elements to engage with each other.

What is claimed is:

1. A control device for a vehicle having an automatic transmission that includes a plurality of frictional engagement elements that are each selectively switched between engaged and disengaged states to selectively establish a plurality of shift stages, the control device comprising:
an electronic control unit configured to perform gear shift control when performing a gear shift operation between different ones of the plurality of shift stages, the gear shift control being based on a target gear shift characteristic value, the target gear shift characteristic value being determined based on an input torque of the automatic transmission at a gear shift start time; and
the electronic control unit is configured so that when the electronic control unit determines that the input torque has decreased during the gear shift operation so as to become equal to or less than a first predetermined torque, the electronic control unit updates the target gear shift characteristic value to a first target value and continues to perform the gear shift control based on the first target value from a first updating time at which the input torque was determined to have become equal to or less than the first predetermined torque, wherein
the first predetermined torque is less than the input torque at the gear shift start time by a predetermined amount, and the first target value is a value of the target gear shift characteristic value that would be determined when the gear shift operation starts with the input torque being equal to the first predetermined torque.

2. The control device according to claim 1, wherein
the electronic control unit is configured so that when the electronic control unit determines that the input torque has further decreased during the gear shift operation to become equal to or less than a second predetermined torque after the input torque has become equal to or less than the first predetermined torque and the target gear shift characteristic value has been updated to the first target value, the electronic control unit updates the target gear shift characteristic value to a second target value and continues to perform the gear shift control based on the second target value from a second updating time at which the input torque was determined to have become equal to or less than the second predetermined torque, wherein
the second predetermined torque is less than the first predetermined torque, and the second target value is a value of the target gear shift characteristic value that would be determined when the gear shift operation starts with the input torque being equal to the second predetermined torque.

3. The control device according to claim 1, wherein
a degree of delivery of torque between an engagement-side clutch and a disengagement-side clutch of the frictional engagement elements progresses during the gear shift operation from 0% at the gear shift start time to 100% at a gear shift end time.

4. The control device according to claim 1, wherein
the target gear shift characteristic value is based on one of a target value of a shifting time and a target value of a driving force of the vehicle.

5. A control method for a vehicle having an automatic transmission that includes a plurality of frictional engagement elements that are each selectively switched between engaged and disengaged states to selectively establish a plurality of shift stages, the control method comprising:
performing, by an electronic control unit of the vehicle, gear shift control when performing a gear shift operation between different ones of the plurality of shift stages, the gear shift control being based on a target gear shift characteristic value, the target gear shift characteristic value being determined based on an input torque of the automatic transmission at a gear shift start time; and
when the electronic control unit determines that the input torque has decreased during the gear shift operation so as to become equal to or less than a first predetermined torque, updating, by the electronic control unit, the target gear shift characteristic value to a first target value and continuing to perform, by the electronic control unit, the gear shift control based on the first target value from a first updating time at which the input torque was determined to have become equal to or less than the first predetermined torque, wherein
the first predetermined torque is less than the input torque at the gear shift start time by a predetermined amount, and the first target value is a value of the target gear shift characteristic value that would be determined when the gear shift operation starts with the input torque being equal to the first predetermined torque.

* * * * *